US008325945B2

(12) United States Patent
Fujita

(10) Patent No.: US 8,325,945 B2
(45) Date of Patent: Dec. 4, 2012

(54) MIXING CONTROL DEVICE

(75) Inventor: Hiroaki Fujita, Hamamatsu (JP)

(73) Assignee: Yamaha Corporation (JP)

( * ) Notice: Subject to any disclaimer, the term of this patent is extended or adjusted under 35 U.S.C. 154(b) by 318 days.

(21) Appl. No.: 12/842,584

(22) Filed: Jul. 23, 2010

(65) Prior Publication Data

US 2011/0019841 A1 Jan. 27, 2011

(30) Foreign Application Priority Data

Jul. 23, 2009 (JP) ................................. 2009-172047

(51) Int. Cl.
*H04B 1/00* (2006.01)
(52) U.S. Cl. ....................................... 381/119; 381/104
(58) Field of Classification Search .................. 381/119, 381/61, 59, 56, 104, 109; 700/94
See application file for complete search history.

(56) References Cited

U.S. PATENT DOCUMENTS

2002/0065570 A1* 5/2002 Fujita et al. ..................... 700/94
2008/0069382 A1 3/2008 Terada et al.
2009/0028359 A1* 1/2009 Terada et al. ................. 381/119

FOREIGN PATENT DOCUMENTS

JP 2008-067007 A 3/2008
JP 2008-219817 A 9/2008

* cited by examiner

*Primary Examiner* — Vivian Chin
*Assistant Examiner* — Friedrich W Fahnert
(74) *Attorney, Agent, or Firm* — Rossi, Kimms & McDowell LLP

(57) ABSTRACT

A mixing control device has a plurality of input channels for processing and mixing audio signals according to parameters specified in the respective input channels. In the mixing control device, a plurality of channel strips are grouped into a first portion and a second portion, each channel strip having a fader operable for controlling a parameter. An allocating part allocates the plurality of the input channels to the plurality of the channel strips so that the fader of the channel strip is operable to control the parameter of the input channel allocated to the channel strip. An instructing part provides an instruction to switch the parameter to be controlled by the fader. In response to the instruction, a switching part switches a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

8 Claims, 6 Drawing Sheets

FIG.6

252 : SWITCHING TABLE

| Ch STRIPS | FLIP MODE OFF | | FLIP MODE ON | |
|---|---|---|---|---|
| | CH | PARAMETER | CH | PARAMETER |
| 38-1 | Ch17 | SIGNAL LEVEL | *36-1 | SEND LEVEL (to MIX2) |
| 38-2 | Ch18 | SIGNAL LEVEL | *36-2 | SEND LEVEL (to MIX2) |
| ⋮ | ⋮ | ⋮ | ⋮ | ⋮ |
| 38-16 | Ch32 | SIGNAL LEVEL | *36-16 | SEND LEVEL (to MIX2) |

MIXING CONTROL DEVICE

BACKGROUND OF THE INVENTION

1. Technical Field of the Invention

The present invention relates to a mixing control device that is suitable for use in mixing audio signals in a concert hall, a recording studio, or the like.

2. Description of the Related Art

A combination of a fader, a knob, a push switch, and the like for adjusting audio signals of one channel, which are provided on a control panel of a mixer used in a concert or the like, is referred to as a "channel strip". The fader has excellent manipulation properties, compared to the knob, and has characteristics capable of finely, accurately, and rapidly adjusting an allocated parameter. Only one fader is generally provided on one channel strip since the fader requires a wide mounting area. The fader is typically used to adjust the signal level of the corresponding channel. A technology for allocating the functionality of the fader to another parameter (typically, a send level for a mix bus) so as to more effectively use the manipulation properties of the fader is known in the art.

Japanese Patent Application Publication No. 2008-067007 describes a technology in which, when a "sends on fader" function is activated, a fader is allocated a send level for a target bus (a preset mix bus) as a parameter that can be adjusted using the fader. Japanese Patent Application Publication No. 2008-219817 describes a technology in which a "flip switch" is provided. When the flip switch is turned on, parameters of a knob and a fader are switched to allow a send level to be allocated to the fader.

However, in the technologies described above, two parameters (for example, a signal level and a send level) of one channel cannot be simultaneously adjusted using a fader and one of the two parameters should be adjusted using a manipulator or control (for example, a knob) other than the fader. When the two parameters are alternately adjusted using a fader, there is a need to switch the functions of the fader each time a parameter is adjusted using the fader, thereby causing inconvenience of manipulation.

SUMMARY OF THE INVENTION

The invention has been made in view of the above circumstances and it is an object of the invention to provide a mixing control device which allows two parameters of one channel to be simultaneously manipulated using a fader as needed.

The invention is characterized by the following configurations to achieve the above object. The inventive mixing control device, having a plurality of input channels for processing and mixing audio signals according to parameters specified in the respective input channels, comprises: a plurality of channel strips that are grouped into at least a first portion and a second portion, each channel strip having a fader operable for controlling a parameter; an allocating part that allocates the plurality of the input channels to the plurality of the channel strips so that the fader of the channel strip is operable to control the parameter of the input channel allocated to the channel strip; an instructing part that provides an instruction to switch the parameter to be controlled by the fader; and a switching part that switches, in response to the instruction, a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

Preferably, in case that the switching part switches the parameter in response to the instruction, the faders of the channel strips belonging to the first portion is operable to control a first type of the parameter while the faders of the channel strips belonging to the second portion is operable to control a second type of the parameter of the channels belonging to the first portion, the second type of the parameter is different from the first type of the parameter.

Further, the switching part does not switch, in response to the instruction, the first type of the parameter controlled by the faders of the channel strips of the first portion, while the switching part does switch, in response to the instruction, a previous type of parameter controlled by the faders of the channel strips belonging to the second portion to the second type of the parameter of the channels allocated to the channel strips belonging to the first portion.

For example, the first type of the parameter is one of a signal level for controlling a level of the audio signal fed to the input channel and a send level for controlling a level of the audio signal sent out from the input channel.

In a preferred form, the plurality of the channel strips are arranged on an operating panel in a multiple of rows, and wherein the first portion of the channel strips is positioned at one of an upper row and a lower row and the second portion of the channel strips is positioned at the other of the upper row and the lower row.

Further, the mixing control device comprises a grouping part that specifies the first portion and the second portion of the channel strips among the plurality of the channel strips arranged on the operating panel such a manner that the first portion and the second portion are associated with each other on the operating panel.

The present invention covers a machine readable storage medium for use in a mixing control device having a processing unit and a plurality of input channels for processing and mixing audio signals according to parameters specified in the respective input channels, the medium containing program instructions executable by the processing unit to perform a process comprising: grouping a plurality of channel strips arranged on the mixing control device into at least a first portion and a second portion, each channel strip having a fader operable for controlling a parameter; allocating the plurality of the input channels to the plurality of the channel strips so that the fader of the channel strip is operable to control the parameter of the input channel allocated to the channel strip; providing an instruction to switch the parameter to be controlled by the fader; and switching, in response to the instruction, a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

The invention further provides a method of processing and mixing audio signals through input channels according to parameters specified in the respective input channels in a mixing control device, the method comprising: grouping a plurality of channel strips arranged on the mixing control device into at least a first portion and a second portion, each channel strip having a fader operable for controlling a parameter; allocating the plurality of the input channels to the plurality of the channel strips so that the fader of the channel strip is operable to control the parameter of the input channel allocated to the channel strip; providing an instruction to switch the parameter to be controlled by the fader; and switching, in response to the instruction, a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

According to the invention, when a predetermined switching instruction is received, a control operation is performed so that a send level for sending an audio signal from an input channel allocated to a first channel strip of the first portion to a preset mix bus is allocated to a fader belonging to a second channel strip of the second portion that is associated with the first channel strip and a signal level of the input channel is also allocated to a fader belonging to the first channel strip. Accordingly, two parameters of one channel can be simultaneously manipulated using a fader.

BRIEF DESCRIPTION OF THE DRAWINGS

FIG. 6 illustrates a data structure of the digital mixer.

DETAILED DESCRIPTION OF THE INVENTION

1. Hardware Configuration of Embodiment

A hardware configuration of a digital mixer 1 of an embodiment of the invention will now be described with reference to FIG. 1.

Figure 1:
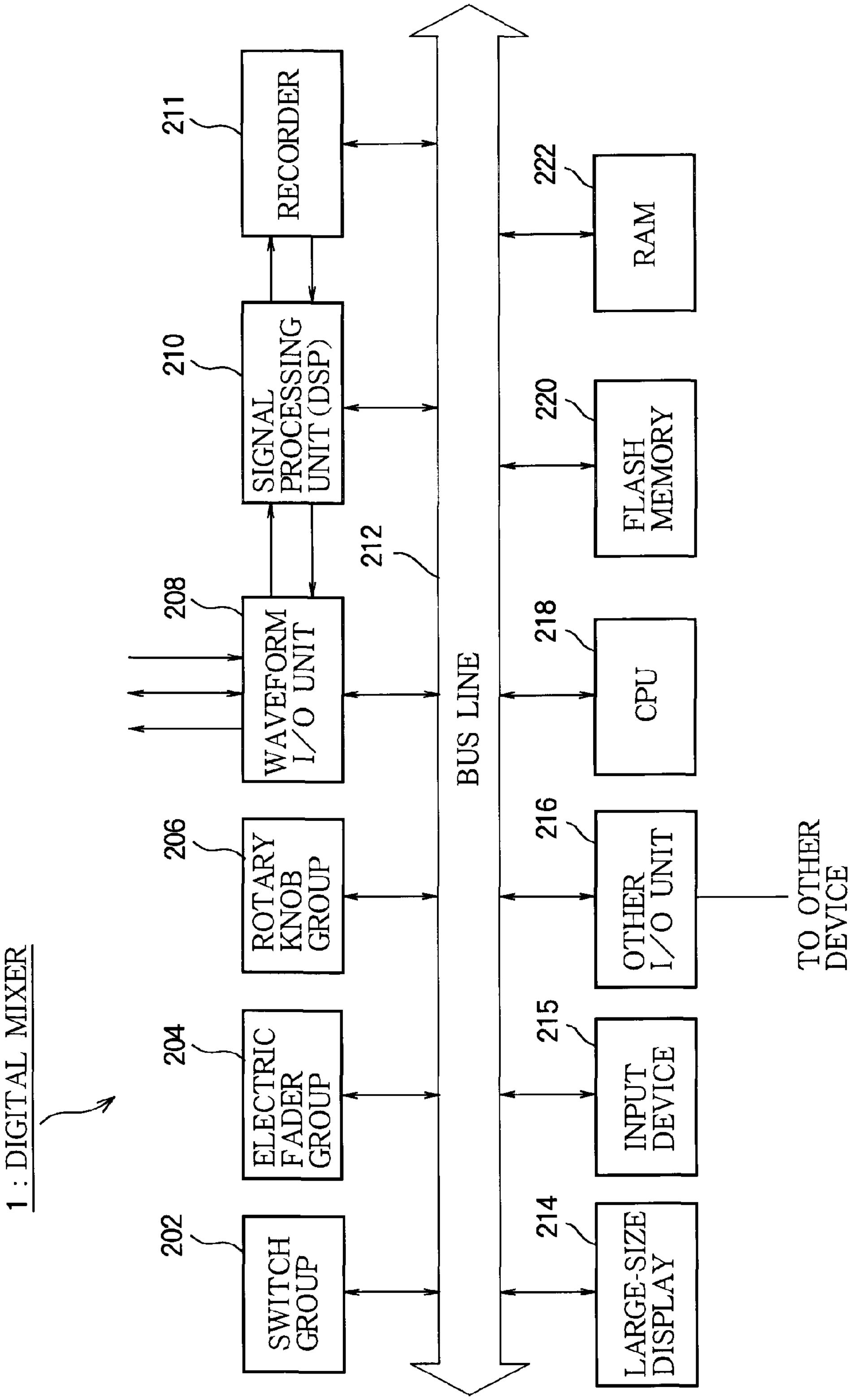
FIG. 1 is a block diagram of a digital mixer of an embodiment of the invention.

In FIG. 1, reference numeral "204" denotes an electric fader group including a plurality of electric faders, each of which controls the signal level or the like of a corresponding input/output channel based on manipulation of the fader. Each of the electric faders is constructed such that a manipulation position of the electric fader is automatically set when a manipulation command has been provided to the electric fader through a bus line 212.

Reference numeral "202" denotes a switch group including a variety of switches and LED keys, and the on/off state of an LED embedded in each LED key is set through the bus line 212. Reference numeral "206" denotes a rotary knob group including a plurality of rotary knobs, each of which sets a left and right volume balance, a send level, or the like of a corresponding input/output channel. The amount of manipulation of each of the rotary knobs is output through the bus line 212. Reference numeral "208" denotes a waveform input/output unit that receives and outputs an analog or digital audio signal. In this embodiment, a mixing process, effects processing, and the like of various audio signals are all performed through digital processing. However, audio signals input to the digital mixer 1 and audio signals output from the digital mixer 1 may each be either digital or analog. Therefore, processes such as conversion between analog and digital signals, conversion between a plurality of types of digital signals, and the like are performed in the waveform input/output unit 208.

Reference numeral "210" denotes a signal processing unit including a group of Digital Signal Processors (DSPs). The signal processing unit 210 performs a mixing process or effects processing on a digital audio signal, which is provided to the signal processing unit 210 through the waveform input/output unit 208, and outputs the resulting signal to the waveform input/output unit 208. Reference numeral "211" denotes a recorder that records and reproduces a digital audio signal. Reference numeral "214" denotes a large-size display including, for example, a flat panel display having resolution of about 1024×768 pixels. Reference numeral "215" denotes an input device that includes various manipulators on a control panel or operating panel of the mixer device. A touch panel is attached to a top of the large-size display 214. This touch panel is also included in the input device 215. Reference numeral "216" denotes another input/output unit that receives and outputs time codes and other information from and to a variety of external devices. Reference numeral "218" denotes a CPU that controls each of the components through the bus line 212 based on a control program described later. Reference numeral "220" denotes a flash memory including a program region that stores the control program. Namely, the flash memory is machine readable storage medium for storing the control program. Reference numeral "222" denotes a RAM that is used as a working memory of the CPU 218.

In the digital mixer of this embodiment, current values (current data) of various parameters for controlling current operations are stored in a predetermined region (current region) of the RAM 222. That is, the contents of the current data are updated by manipulating the switch group 202, the electric fader group 204, the rotary knob group 206, or the input device 215, and the mixing process or effects processing of the signal processing unit 210, the display state of the large-size display 214, the on/off states of the LEDs of the switch group 202, respective positions of the faders of the electric fader group 204, and the like are controlled based on the current data.

2. Configuration of Mixing Algorithm

Figure 2:
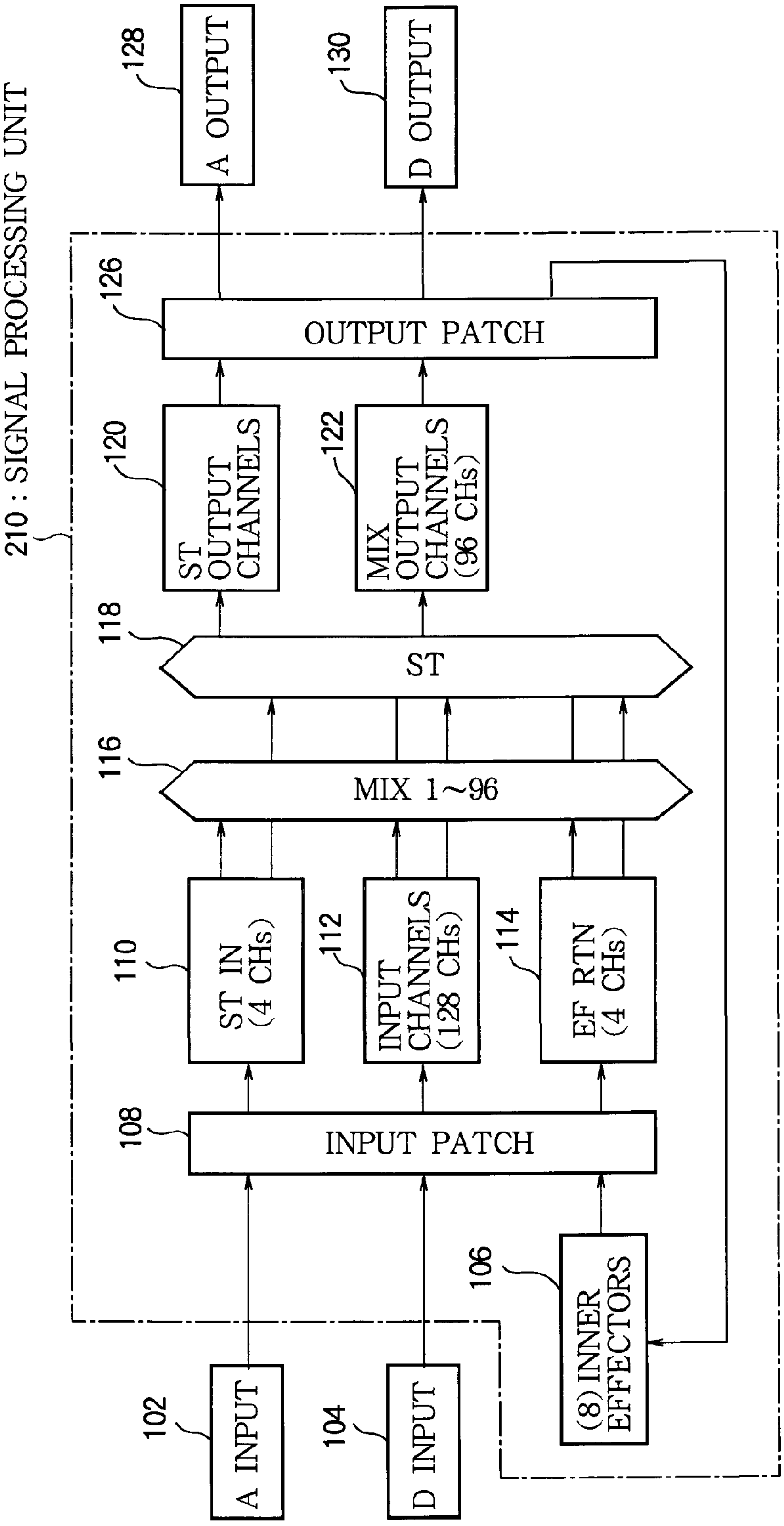
FIG. 2 is a block diagram of an algorithm of the digital mixer.

Details of an algorithm implemented in the signal processing unit 210 or the like are described below with reference to FIG. 2. The algorithm is implemented by a program set in the signal processing unit 210 and the program is loaded from the flash memory 220 into the signal processing unit 210 under control of the CPU 218. In FIG. 2, reference numeral "102" denotes an analog input unit that converts, when an analog audio signal at a microphone level or a line level is received, the analog audio signal into a digital audio signal and provides the digital audio signal to the signal processing unit 210. Reference numeral "104" denotes a digital input unit that converts, when a digital audio signal is received, the digital audio signal into an internal format of the signal processing unit 210. Reference numeral "128" denotes an analog output unit that converts a digital audio signal provided from the signal processing unit 210 into an analog audio signal and outputs the analog audio signal. Reference numeral "130" denotes a digital output unit that converts a digital audio signal having an internal format provided from the signal processing unit 210 into a digital audio signal having a predetermined format such as ASE/EBU, ADAT, and TASCAM and outputs the digital audio signal.

While the configurations described above are implemented through the waveform input/output unit 208, which is hardware separate from the signal processing unit 210, and a variety of cards inserted into the waveform input/output unit 208, other configurations are implemented through a program running on the signal processing unit 210. Reference numeral "112" denotes an input channel adjustment unit that performs adjustment of volume, sound quality, and the like on up to 128 input channels based on manipulation of manipulators (controls) and electric faders on the control panel. Reference numeral "110" denotes a stereo input channel adjustment unit that performs adjustment of volume, sound quality, and the like on up to 4 stereo input channels. Here, it is assumed that one stereo audio signal includes two audio signals.

Reference numeral "114" denotes an effects return unit that performs adjustment of volume, sound quality, or the like on a 4-channel audio signal. The effects return unit 114 is typically allocated to an audio signal on which effects processing has been performed. Reference numeral "108" denotes an input patch unit that allocates digital audio signals provided from a plurality of input ports such as the input units 102 and 104 to desired input channels of the stereo input channel adjustment unit 110, the input channel adjustment unit 112, and the effects return unit 114. Reference numeral "106" denotes an internal effecter unit that includes up to 8 effectors and performs effects processing such as reverb, delay, and modulation on an audio signal provided to the internal effecter unit and provides the resulting signal to the effects return unit 114 through the input patch unit 108.

Figure 3:
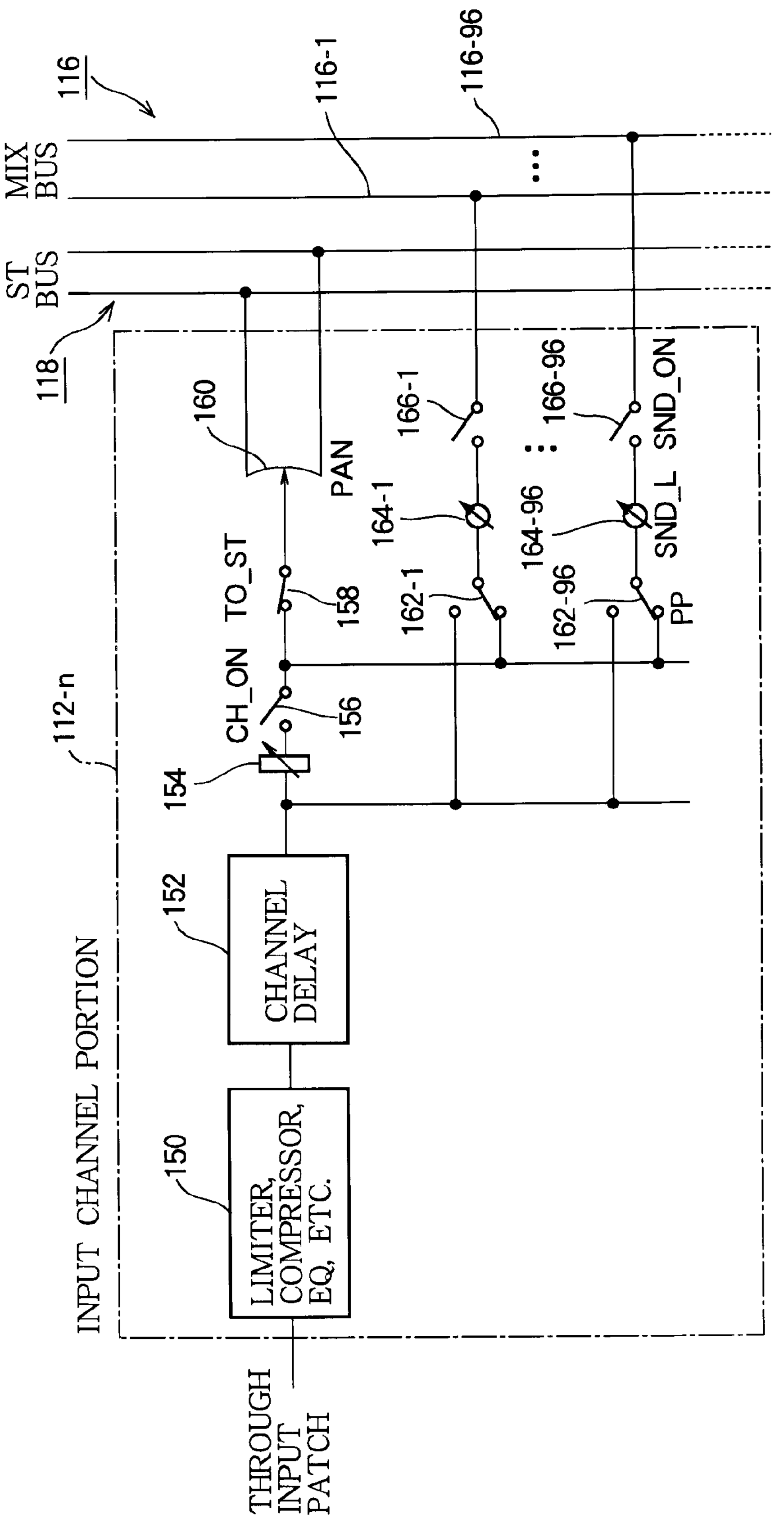
FIG. 3 is a block diagram of a main part of the algorithm.

Reference numeral "116" denotes a mix bus group that includes 96 mix buses 116-1 to 116-96 (see FIG. 3). Each mix bus mixes digital audio signals which are provided to the mix bus from among digital audio signals of the input channels, the stereo input channels, and the effects returns (which will hereinafter be referred to as "input channels or the like"). For each input channel or the like, whether or not an audio signal of the input channel is to be provided to the mix bus can be set for each mix bus and, in the case where the audio signal of the input channel is provided to the mix bus, the send level, fade mode (pre-fade/post-fade), or the like of the audio signal for the mix bus can be set independently for each mix bus. Reference numeral "118" denotes a stereo bus that includes a single bus. The configuration of the stereo bus is identical to that of the mix bus described above.

Reference numeral "120" denotes a stereo output channel portion that performs level and sound quality adjustment on a mixed signal in the stereo bus. Reference numeral "122" denotes a mix output channel portion that performs level and sound quality adjustment on a mixed signal in each mix bus. Reference numeral "126" denotes an output patch unit that allocates output signals of the stereo output channel portion 120 and the mix output channel portion 122 to desired ones of the output units 128 and 130 and the internal effecter unit 106 described above.

A detailed configuration of the algorithm in the input channel adjustment unit 112 is described below with reference to FIG. 3. In FIG. 3, reference numeral "112-*n*" denotes an nth input channel adjuster that performs sound quality and volume adjustment on an nth input channel. Reference numeral "150" shown in the nth input channel adjuster 112-*n* denotes a sound quality adjuster that performs limiter processing, compressor processing, equalizer processing, and the like on the nth input channel. Reference numeral "152" denotes a channel delayer that delays an audio signal of the nth input channel as needed. Reference numeral "154" denotes a volume adjuster that adjusts a signal level (i.e., audio signal gain) of the nth input channel. Reference numeral "156" denotes an on/off switch that switches on or off the entirety of the nth input channel.

Reference numerals "162-1" to "162-96" denote signal switches, which switch on or off audio signals that can be output from the nth input channel to the mix buses 116-1 to 116-96, according to the fade mode. That is, an output signal of the channel delayer 152 is selected when the fade mode is set to "pre-fade" and an output signal of the on/off switch 156 is selected when the fade mode is set to "post-fade". Reference numerals "164-1" to "164-96" denote send level adjusters that adjust gains (i.e., send levels) of signals to be output to the mix buses. Reference numerals "166-1" to "166-96" denote send on/off switches that set on/off states of provision of audio signals to the mix buses. Reference numeral "158" denotes a stereo send on/off switch that switches on/off states of provision of an audio signal of the nth input channel to the stereo bus 118. Reference numeral "160" denotes a PAN setter that sets left and right volume balance when providing the audio signal to the stereo bus 118.

3. Panel Configuration

The control panel of the digital mixer 1 is described below with reference to FIG. 4 which is a plan view of the control panel.

Figure 4:
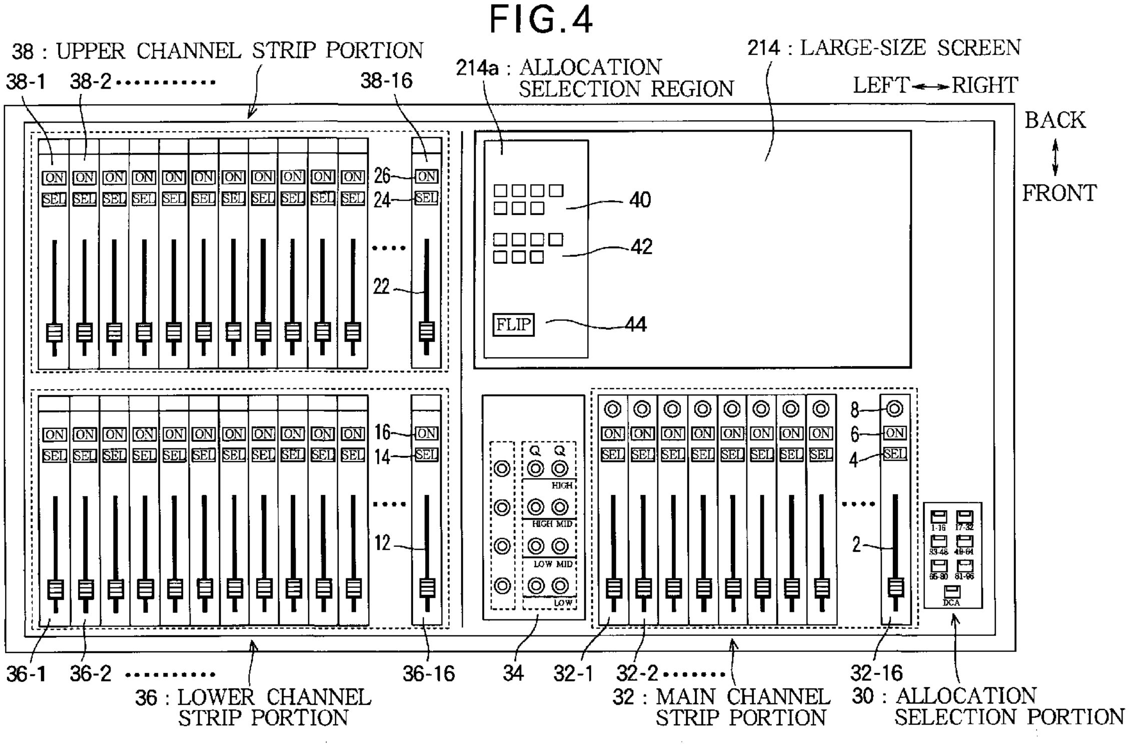
FIG. 4 is a plan view of a control panel of the digital mixer.

In FIG. 4, a plurality of channel strips is disposed on the control panel. Each channel strip is a set of manipulators (controls) for adjusting an audio signal of one channel. One channel strip generally includes one fader. One channel is allocated, as a channel for manipulation, to one channel strip. Current values of various parameters of a channel for manipulation are adjusted using various manipulators on the channel strip.

Reference numeral "32" denotes a main channel strip portion that includes 16 main channel strips 32-1 to 32-16 arranged in a left-right direction. Reference numeral "2" shown in the main channel strip 32-16 denotes an electric fader that controls a signal level or the like of an input/output channel allocated to the main channel strip 32-16. Reference numeral "6" denotes an on/off key that sets an on/off state of the on/off switch 156 of a corresponding input/output channel. Reference numeral "4" denotes a SEL key that selectively sets the input/output channel corresponding to the main channel strip 32-16 to a "selected state". This selected input/output channel is referred to as a "selected channel".

Here, the term "selected state" refers to a state in which the input/output channel has been selected as a channel that should be subjected to detailed setting of the sound quality adjuster 150 or the signal switches 162-1 to 162-96. Reference numeral "8" denotes a rotary knob that is used to set a left/right audio volume balance in the PAN setter 160, a send level for a specified mix bus 116-*m* ($1 \leqq m \leqq 96$), or the like of the input/output channel. Although the configuration of only the main channel strip 32-16 has been described above, each of the other main channel strips 32-1 to 32-15 has the same configuration as the main channel strip 32-16.

Reference numeral "36" denotes a lower channel strip portion (first portion or first group of channel strips) that includes 16 lower channel strips 36-1 to 36-16 arranged in a left-right direction. Reference numeral "12" shown in the lower channel strip 36-16 denotes an electric fader, "14" denotes a SEL key, "16" denotes an on/off key. The electric fader 12, the SEL key 14, and the on/off key 16 have the same configurations as the electric fader 2, the SEL key 4, and the on/off key 6, respectively. Each of the other lower channel strips 36-1 to 36-15 also has the same configuration as the lower channel strip 36-16.

Reference numeral "38" shown at the top side of the lower channel strip portion 36 denotes an upper channel strip portion (second portion or second group of channel strips) that includes 16 upper channel strips 38-1 to 38-16 arranged in a left-right direction. Reference numeral "22" shown in the upper channel strip 38-16 denotes an electric fader, "24" denotes a SEL key, and "26" denotes an on/off key. The electric fader 22, the SEL key 24, and the on/off key 26 have the same configurations as the electric fader 2, the SEL key 4, and the on/off key 6, respectively. Each of the other upper channel strips 38-1 to 38-15 has the same configuration as the upper channel strip 38-16. The upper channel strips 38-1 to 38-16 have the same widths as the lower channel strips 36-1 to 36-16, respectively, and are arranged in a up-down direction when viewed from the front side of the digital mixer 1 such that the positions, in a left-right direction, of the upper channel strips 38-1 to 38-16 match those of the lower channel strips 36-1 to 36-16. Namely, the plurality of the channel strips are arranged on an operating panel in a multiple of rows, and the first portion 36 of the channel strips is positioned at one of an upper row and a lower row and the second portion 38 of the channel strips is positioned at the other of the upper row and the lower row. The grouping part specifies the first portion 36 and the second portion 38 of the channel strips among the plurality of the channel strips arranged on the operating panel such a manner that the first portion 36 and the second portion 38 are associated with each other on the operating panel.

The digital mixer 1 includes the 128 input channels as described above, which are grouped into 8 layers, each including 16 channels. Similarly, the 96 mix output channels are grouped into 6 layers, each including 16 channels. A layer can be arbitrarily allocated to each of the above channel strip portions 32, 36, and 38. Reference numeral "30" denotes an allocation selection portion that includes a plurality of keys for selecting a layer to be allocated to the main channel strip portion 32. When it is detected that one of the keys has been manipulated, a layer selected through the keys is allocated to the main channel strip portion 32. That is, 16 channels included in the selected layer are allocated, as manipulation target channels, to the 16 channel strips of the main channel strip portion 32, respectively. The manipulation target channel currently allocated to each channel strip is recorded, as assignment data of the channel strip, in the RAM 222. The types of parameters, which are to be currently manipulated by controls included in the channel strip, are also recorded in the assignment data. The types of the parameters, which are to be manipulated, are set by default when a new layer is allocated to the main channel strip portion 32. For example, a signal level is allocated by default to the type of parameter to be controlled by the electric fader.

Reference numeral "34" denotes a selected channel manipulation portion that includes a plurality of rotary knobs and keys for setting parameters of the sound quality adjuster 150 (see FIG. 3) of the selected channel which is a channel selected using the SEL key 4, 14, or 24.

The large-size display 214 includes an allocation selection region 214*a* at a left side thereof. The allocation selection region 214*a* is provided with an allocation selection portion 40, which has the same function as the allocation selection portion 30 described above and is used to select a layer to be allocated to the upper channel strip portion 38, an allocation selection portion 42, which also has the same function as the allocation selection portion 30 and is used to select a layer to be allocated to the lower channel strip portion 36, and a flip key 44. The function of each of the allocation selection portions 40 and 42 is identical to that of the allocation selection portion 30 and layers are allocated to the upper channel strip portion 38 and the lower channel strip portion 36 (specifically, manipulation target channels and parameter types of the channel strips are changed and assignment data thereof is rewritten) according to manipulation of keys of the allocation selection portions 40 and 42. The flip key 44 is used to toggle a flip mode (details of which will be described later) on and off. The flip key 44 is lit on when the flip mode is on and is lit off when the flip mode is off.

4. Data Configuration of Embodiment

A switching table 252 shown in FIG. 6 is recorded in the RAM 222. The switching table 252 is data representing change of assignment data according to switching of the flip mode. Details of the switching table 252 are described below with reference to FIG. 6. Change target channel strips whose assignment data is changed according to switching of the flip mode are recorded in a "Ch strip" field. In this embodiment, the change target channel strips are the upper channel strips and thus identification numbers "38-1" to "38-16" indicating the upper channel strips are recorded in the "Ch strip" field.

Data, to which the assignment data of the change target channel strips is changed when the flip mode has been switched from off to on, (i.e., the types of parameters and channels newly allocated to the change target channel strips when the flip mode has been switched from off to on) is recorded in the "flip mode ON" field.

In this embodiment, the upper channel strips and the lower channel strips arranged in a up-down direction on the panel are associated with each other in a one-to-one fashion. When the flip mode is on, a manipulation target channel of a channel strip (i.e., a lower channel strip) that is associated with each change target channel strip (i.e., each upper channel strip) is allocated to the change target channel strip and a parameter type (send level) different from the signal level of the electric fader of the change target channel strip is allocated to the change target channel strip.

Accordingly, identification numbers "*36-1" to "*36-16" indicating the manipulation target channels of the lower channel strips that are associated with the change target channel strips are recorded, as newly allocated channels, in a "CH" column of the "flip mode ON" field. Here, the identification numbers "*36-1" to "*36-16" are information indicating channel numbers of manipulation target channels that are currently allocated to the channel strips of the lower channel strips 36-1 to 36-16. In addition, a send level is recorded in a "parameter" column of the "flip mode ON" field as a different parameter type which is newly allocated to the electric fader of the change target channel strips. In this example, a "send level for second mix bus" is recorded in the "parameter" column, where the bus type, for which the send level is recorded, can be freely specified by the user.

Data, to which the assignment data is changed when the flip mode has been switched from on to off, (i.e., the types of parameters and channels newly allocated to the change target channel strips when the flip mode has been switched from on to off) is recorded in the "flip mode OFF" field.

In this embodiment, when the flip mode is off, a parameter type and channels that the user has selected using keys of the allocation selection portion are allocated to the change target channel strips (without being affected by their associated channel strips). Accordingly, input channel numbers "Ch17" to "Ch32" indicating channels (for example, 17th to 32nd input channels) of a layer selected by the user are recorded, as newly allocated channels, in a "CH" column of the "flip mode OFF" field. In addition, the signal level, which is set by default upon layer switching, is recorded in a "parameter" column as a parameter type which is newly allocated to the electric faders.

In this embodiment, layer switching of the channel strips is possible only when the flip mode is off. If it is detected that one of the keys of the allocation selection portion 40 has been manipulated when the flip mode is off, assignment data of the upper channel strips 38-1 to 38-16 is rewritten so that channels of a layer selected through the keys become manipulation target channels of the upper channel strips 38-1 to 38-16. In addition, the manipulation target channels of the upper channel strips 38-1 to 38-16 after the assignment data of the upper channel strips 38-1 to 38-16 is rewritten are overwritten in the "CH" column of the "flip mode OFF" field of the switching table 252.

5. Operation of Embodiment

Figure 5A:
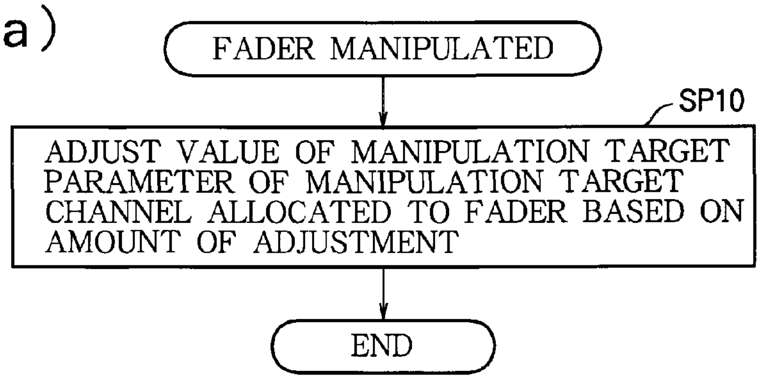
FIGS. 5(*a*) and 5(*b*) are a flow chart of a control program of the digital mixer.
Figure 5B:
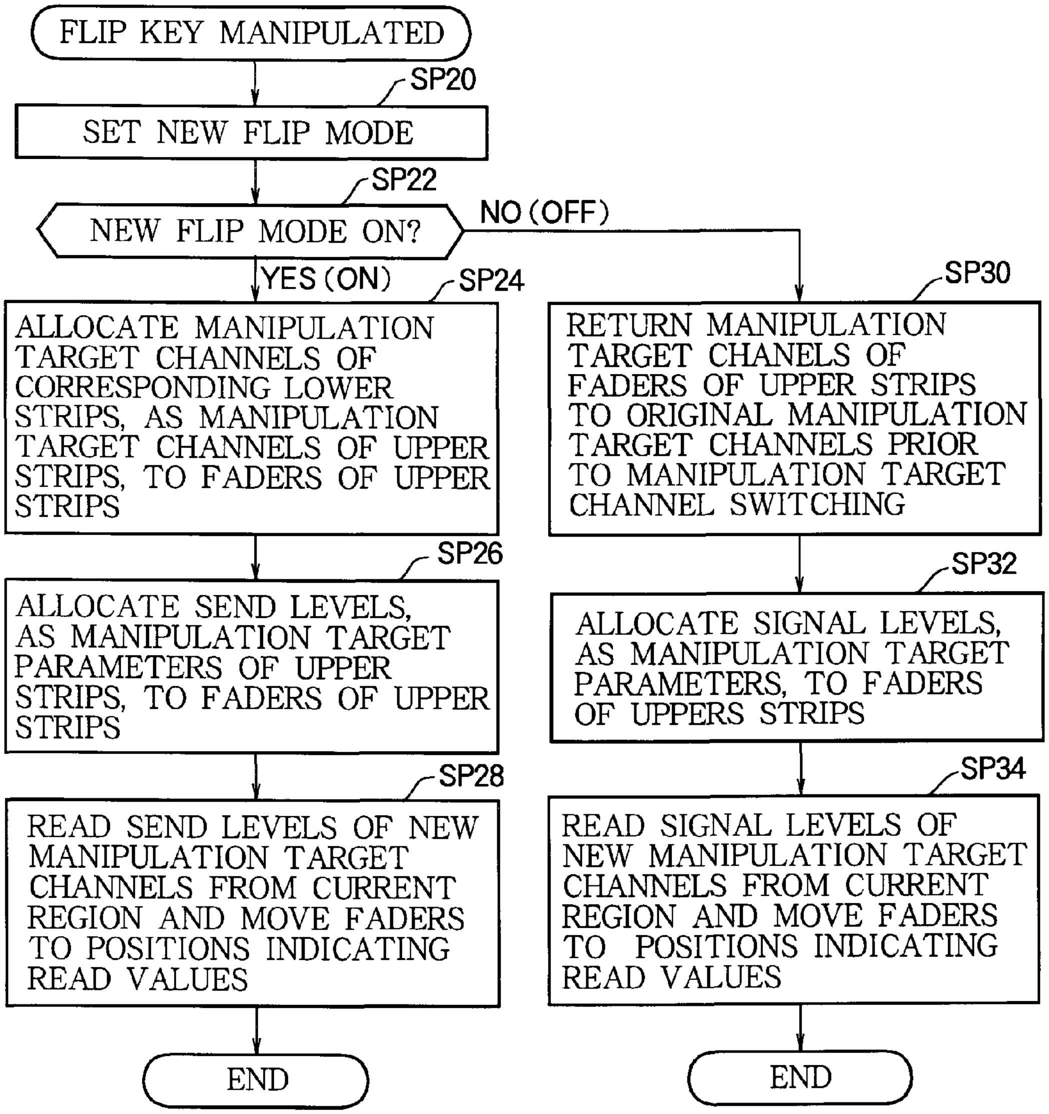

First, when one of the electric faders 2, 12, and 22 has been manipulated, a fader manipulation event routine shown in FIG. 5(*a*) is activated. First, when the procedure of FIG. 5(*a*) proceeds to step SP10, a parameter type and a channel allocated as manipulation target of the manipulated electric fader are specified based on assignment data of a channel strip to which the manipulated electric fader belongs and parameter value of the manipulation target parameter type in a current region is adjusted based on the amount of adjustment of the electric fader. For example, when an electric fader of an upper channel strip, which is a change target channel strip, has been manipulated, the current value of a signal level of a manipulation target channel, which has been allocated to the channel strip through layer switching, is adjusted if the flip mode is off, and the current value of a send level of a manipulation target channel of a lower channel strip corresponding to the upper channel strip is adjusted if the flip mode is on. On the other hand, when an electric fader of a lower channel strip, which is not a change target channel strip, has been manipulated, a signal level of a manipulation target channel, which has been allocated to the channel strip through layer switching, is adjusted, no matter whether the flip mode is on or off.

When the flip key 44 has been pressed, an event routine shown in FIG. 5(*b*) is activated. First, when the procedure shown in FIG. 5(*b*) proceeds to step SP20, a current flip mode (on or off) is reversed to set a new flip mode. Then, when the procedure proceeds to step SP22, whether or not the new flip mode is on is determined.

When it is determined at step S22 that the new flip mode is on, the procedure proceeds to step SP24 at which the content of assignment data of each change target channel strip (upper channel strip) is changed so that channel numbers (CH) specified in the right field (flip mode ON) of the switching table 252 are allocated to the upper channel strips 38-1 to 38-16. In the example of FIG. 6, the channels "*36-1" to "*36-16", which are manipulation target channels of the lower channel strips 36-1 to 36-16 corresponding to (i.e., located immediately below) the upper channel strips 38-1 to 38-16, are allocated to the upper channel strips 38-1 to 38-16. Then, when the procedure proceeds to step SP26, the content of the assignment data of each change target channel strip (upper channel strip) is changed so that a parameter type (typically, send level) specified in the right field (flip mode ON) of the switching table 252 is allocated to the electric faders 22 of the upper channel strips 38-1 to 38-16. In the example of FIG. 6, the parameter type allocated to the electric faders 22 is a "send level for second mix bus 116-2". Here, a control operation is performed for the lower channel strips such that the manipulation target channels of the lower channel strips are the same as those of the corresponding upper channel strips and the electric faders of the lower channel strips are allocated a parameter type (typically, a signal level) different from the parameter type allocated to the electric faders of the corresponding upper channel strips. Typically, the current content of the assignment data of the lower channel strips is kept unchanged.

Then, when the procedure proceeds to step SP28, parameter values according to the parameter type and the channel numbers allocated at the above steps SP24 and SP26 are read from the current region and the electric faders 22 are moved to positions indicating the parameter values. In the above example, the electric faders 22 are moved to positions corresponding to the "send levels" for sending audio signals from manipulation target channels of the lower channel strips 36-1 to 36-16 to the second mix bus 116-2. The light on/off states of the SEL keys 24 and the on/off keys 26 are also changed based on the parameters of the channel numbers (CH) allocated at the above step SP24. Then, the procedure of the routine of FIG. 5(*b*) is terminated.

On the other hand, when the newly set flip mode is off, the result of the determination of the above step SP22 is "NO" and thus the procedure proceeds to step SP30. At step SP30, the content of the assignment data of each change target channel strip (upper channel strip) is changed so that channel numbers (CH) specified in the left field (flip mode OFF) of the switching table 252 are allocated to the electric faders 22 of the upper channel strips 38-1 to 38-16. Here, the allocated channels are the same as when the flip mode is off and are the "17th to 32nd input channels" in the example of FIG. 6. Then, when the procedure proceeds to step SP32, the content of the assignment data of each change target channel strip (upper channel strip) is changed so that a parameter type (typically, signal level) specified in the left field (flip mode OFF) of the switching table 252 is allocated to the electric faders 22 of the upper channel strips 38-1 to 38-16. In the example of FIG. 6, the allocated parameter type is a "signal level".

Then, when the procedure proceeds to step SP34, parameter values corresponding to the parameter type and the channel numbers allocated at the above steps SP30 and SP32 are read from the current region and the electric faders 22 are moved to positions indicating the parameter values. In the above example, the electric faders 22 are moved to positions corresponding to the "signal levels" of the 17th to 32nd input channels. The light on/off states of the SEL keys 24 and the on/off keys 26 are also changed based on the parameters of the channel numbers (CH) allocated at the above step SP30. Then, the procedure of the routine of FIG. 5(*b*) is terminated.

As described above, the invention is characterized by the following configurations. Here, elements in parentheses are only illustrative. The inventive mixing control device is characterized in that the mixing control device is applied to a mixer, which applies a first type of parameter (gain of an audio volume adjuster 154) and a second type of parameter (gains of send level adjusters 164-1 to 164-96) different from the first type of parameter to each of audio signals of a plurality of input channels and then provides the audio signals to a plurality of mix buses (116-1 to 116-96) to mix the audio signals of the plurality of input channels in the mix buses (116-1 to 116-96), and that the mixing control device includes manipulators for adjusting the first and second type of parameters, a plurality of channel strips (36-1 to 36-16 and 38-1 to 38-16), to each of which one of the plurality of input channels is allocated, each of the plurality of channel strips including a fader for adjusting a parameter specified in the allocated input channel, an input channel allocation means (40 and 42) that specifies an input channel to be allocated to each of the channel strips, a defining means (252) that defines an association between the channel strips, and a switching means (SP24, SP26, and SP28) that performs, upon receiving a predetermined switching instruction, a control operation to allocate the second type of parameter of an input channel allocated to a first channel strip to a fader belonging to a second channel strip that is associated with the first channel strip and to allocate the first type of parameter of the input channel to a fader belonging to the first channel strip. Practically, the second channel strip is arranged with respect to the first channel strip in a up-down direction of a casing of the mixing control device.

6. Modifications

The invention is not limited to the above embodiment and may provide various modifications as described below.

(1) Although various processes are performed by the program running on the digital mixer 1, a machine readable recording medium such as a CD-ROM or a memory card, on which the program is stored alone, may be distributed and the program may also be distributed through a transmission line.

(2) Although the switch group 202, the electric fader group 204, the rotary knob group 206, and the signal processing unit 210 are provided in the same casing or panel in the digital mixer 1 of the above embodiment, the digital mixer 1 may be divided into an "engine" in which the signal processing unit 210 is provided and a "console" in which the switch group 202, the electric fader group 204, the rotary knob group 206, and the like are provided. In this case, the "mixing control device" of the invention is typically implemented in the console.

(3) Although the layers of the channel strips are not switched using the allocation manipulation portions 30, 40, and 42 when the flip mode is on in the above embodiment, layers may also be allowed to be switched when the flip mode is on. In this case, when a manipulation to switch the layers has been performed, new layer allocation (channel allocation) may be immediately reflected in the content of the switching table 252 to immediately change assignment data of each channel strip based on the new content of the switching table 252, or otherwise the flip mode may be switched to off to perform new layer allocation.

(4) The switching table 252 represents changes of assignment data according to switching on/off of the flip mode or represents groups of channel strips (or an association between the channel strips) that are associated so that assignment data of the channel strips is changed in an associated manner when the assignment data is changed as the flip mode is switched on/off. The contents of the switching table 252 are not limited to those of the above embodiment. The contents of the switching table 252 may be appropriately changed such that the change target channel strips may be the lower channel strips or the main channel strips, the channel strips that are associated with the change target channel strips may be the upper channel strips or the main channel strips, the parameter type allocated to the electric faders when the flip mode is turned on or off may be a parameter type other than the signal level or the send level (while the parameter type allocated when the flip mode is on is different from that allocated when the flip mode is off), and a plurality of channel strips may be associated with one change target channel strip. In addition, a switching table change function for changing the contents of the switching table 252 according to a change manipulation performed by the user may be provided.

(5) Channel strips, whose assignment data is changed to the content of the "flip mode ON" field in the switching table, are not limited to all channel strips of the upper channel strip portion 38 as in the above embodiment. Assignment of partial channel strips of the upper channel strip portion 38, which are designated by the user, may be changed to the content of the "flip mode ON" field in the switching table and the content of the "flip mode ON" field in the switching table may not be reflected in assignment of the other channel strips of the upper channel strip portion 38 which are not designated by the user (i.e., the assignment of the other channel strips may be unchanged to maintain the current content of the assignment data).

(6) Although the states of components (such as the SEL keys 24 and the on/off keys 36) other than the electric faders 22 in the upper channel strips 38-1 to 38-16 are also switched according to the on/off state of the flip mode in the above embodiment, the states of the components other than the electric faders 22 may not be switched according to the on/off state of the flip mode. That is, the channel numbers (CH) in the "flip mode OFF" field in the switching table 252 (see FIG. 6) may always be applied to the components other than the electric fader 22.

What is claimed is:

1. A mixing control device having a plurality of input channels for processing and mixing audio signals according to parameters specified in the respective input channels, the device comprising:

a plurality of channel strips that are grouped into at least a first portion and a second portion, each channel strip having a fader operable for controlling a parameter;

an allocating part that allocates the plurality of the input channels to the plurality of the channel strips so that the fader of the channel strip is operable to control the parameter of the input channel allocated to the channel strip;

an instructing part that provides an instruction to switch the parameter to be controlled by the fader; and a switching part that switches, in response to the instruction, a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

2. The mixing control device according to claim 1, wherein, in case that the switching part switches the parameter in response to the instruction, the faders of the channel strips belonging to the first portion is operable to control a first type of the parameter while the faders of the channel strips belonging to the second portion is operable to control a second type of the parameter of the channels belonging to the first portion, the second type of the parameter is different from the first type of the parameter.

3. The mixing control device according to claim 2, wherein the switching part does not switch, in response to the instruction, the first type of the parameter controlled by the faders of the channel strips of the first portion, while the switching part does switch, in response to the instruction, a previous type of parameter controlled by the faders of the channel strips belonging to the second portion to the second type of the parameter of the channels allocated to the channel strips belonging to the first portion.

4. The mixing control device according to claim 2, wherein the first type of the parameter is one of a signal level for controlling a level of the audio signal fed to the input channel and a send level for controlling a level of the audio signal sent out from the input channel.

5. The mixing control device according to claim 1, wherein the plurality of the channel strips are arranged on an operating panel in a multiple of rows, and wherein the first portion of the channel strips is positioned at one of an upper row and a lower row and the second portion of the channel strips is positioned at the other of the upper row and the lower row.

6. The mixing control device according to claim 5, further comprising a grouping part that specifies the first portion and the second portion of the channel strips among the plurality of the channel strips arranged on the operating panel such a manner that the first portion and the second portion are associated with each other on the operating panel.

7. A non-transitory machine readable storage medium for use in a mixing control device having a processing unit and a plurality of input channels for processing and mixing audio signals according to parameters specified in the respective input channels, the medium containing program instructions executable by the processing unit to perform a process comprising:

grouping a plurality of channel strips arranged on the mixing control device into at least a first portion and a second portion, each channel strip having a fader operable for controlling a parameter;

allocating the plurality of the input channels to the plurality of the channel strips so that the fader of the channel strip is operable to control the parameter of the input channel allocated to the channel strip;

providing an instruction to switch the parameter to be controlled by the fader; and switching, in response to the instruction, a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

8. A method of processing and mixing audio signals through input channels according to parameters specified in the respective input channels in a mixing control device, the method comprising:

grouping a plurality of channel strips arranged on the mixing control device into at least a first portion and a second portion, each channel strip having a fader operable for controlling a parameter;

allocating the plurality of the input channels to the plurality of the channel strips so that the fader of the channel strip is operable to control the parameter of the input channel allocated to the channel strip;

providing an instruction to switch the parameter to be controlled by the fader; and switching, in response to the instruction, a parameter controlled by the faders of channel strips belonging to the second portion to another parameter of channels allocated to channel strips belonging to the first portion, so that both of the faders of the channel strips belonging to the first portion and the second portion are operable to control the parameters of the channels allocated to the channel strips belonging to the first portion.

* * * * *